May 1, 1962 R. G. STEIN 3,031,744
TOOL FOR INSERTING PRESS-FIT WRIST PINS
Filed May 22, 1959 2 Sheets-Sheet 2

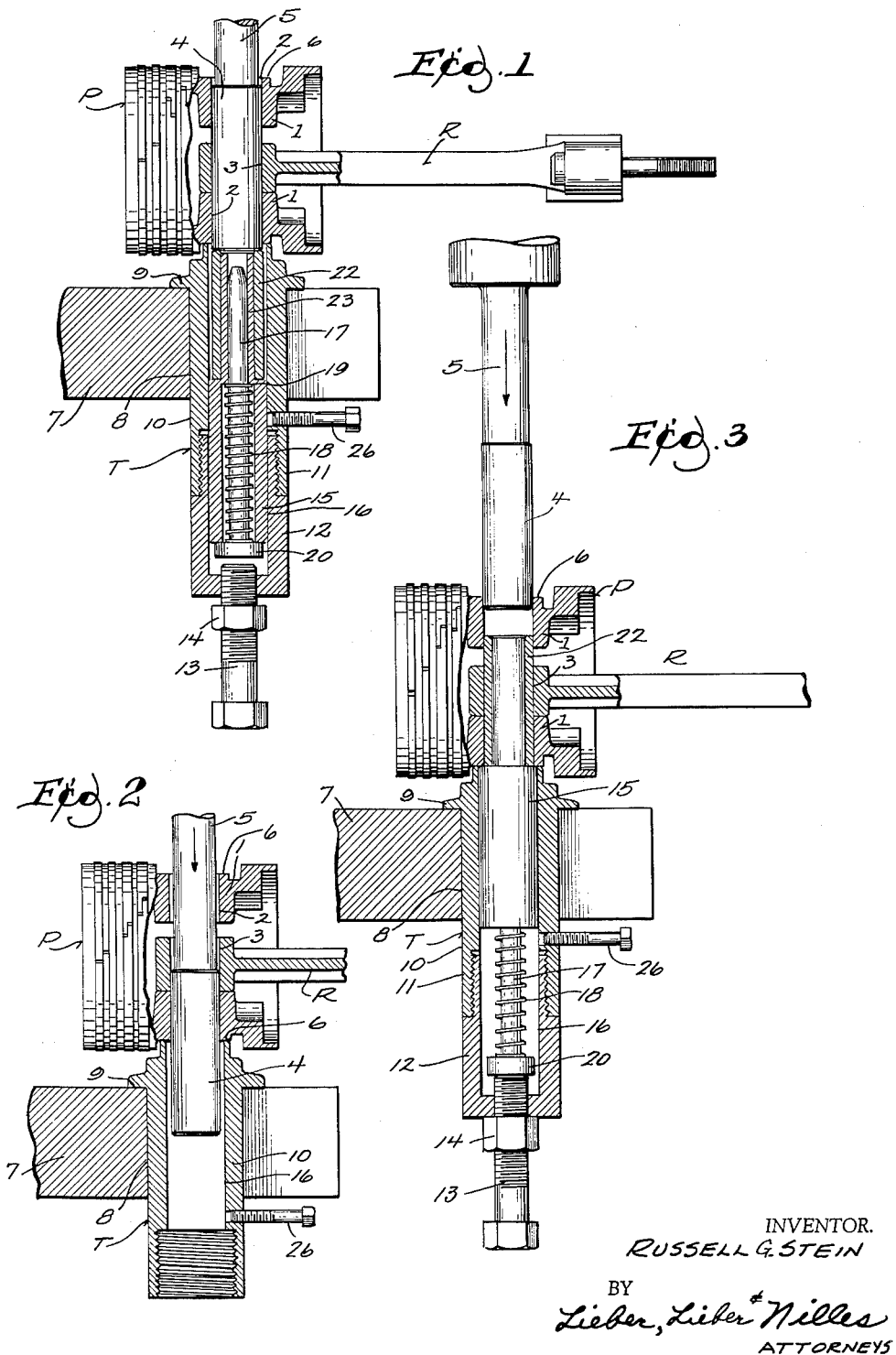

INVENTOR.
RUSSELL G. STEIN
BY
Lieber, Lieber & Nilles
ATTORNEYS

United States Patent Office 3,031,744
Patented May 1, 1962

3,031,744
TOOL FOR INSERTING PRESS-FIT WRIST PINS
Russell G. Stein, 1324 Mackinac Ave.,
South Milwaukee, Wis.
Filed May 22, 1959, Ser. No. 815,038
2 Claims. (Cl. 29—283)

This invention relates to a tool for facilitating the assembly of a piston, piston rod and wrist pin. More particularly, the invention relates to a guide mechanism for maintaining alignment between the holes in the rod and piston through which the pin is to be inserted.

In modern automotive construction the wrist pin is press-fit into its hole in the rod so that the pin is fixed on the rod and will not shift relative thereto. The extending ends of the pins are oscillatably journalled in the piston and therefore the pin does not form as close a fit with its mounting holes in the piston as it does with the rod. It is desirable to have the rod mounted on the center of the pin in order that one end of the pin does not protrude past the outside diameter of the piston and thereby score the cylinder walls.

Heretofore it has been a difficult task to precisely align the holes in the piston and in the rod and maintain this alignment while pressing the pin therethrough. Stated otherwise, due to the press fit required between the pin and rod, it is a very difficult job to obtain and maintain exact registry of the parts for such an assembly operation. The assembly process, with the rod cocking in one direction or another, has often resulted in distortion of the holes in either or both the piston and rod, or distortion or collapse of the piston itself. These pins are inserted by applying considerable force, from a hydraulic press for example, and any cocking of the rod or misalignment of parts can easily result in worn or chipped piston, particularly at the ends of the holes. Therefore, as well as taking considerable time to insert these wrist pins, the assembly sometimes results in damaged parts.

In accordance with the present invention, a tool has been provided for precisely aligning the holes in the piston and in the rod and holding them in alignment as the pin is forcibly inserted through the piston and rod. The arrangement is such that any misalignment or cocking of the rod is prevented during the assembly operation and damage to any of the parts prevented.

More specifically, the invention provides a guide tool of the above type which can be set at a predetermined position to limit the depth at which the pin is inserted in the piston. In this manner, the rod is mounted centrally on the pin.

The above predetermined setting of the tool is quickly measured from a properly assembled unit and the tool easily set to the exact depth-stop position. Thus when the pins must be pulled from any given piston-rod assembly, the tool is first set in accordance with one of the properly assembled units. Then later when the piston-rod units are to be reassembled, the pins will be inserted to the proper depth in the piston and in proper position relative to the rod.

The guide tool provided by the present invention is capable of accommodating a number of different sizes of pins by the use of various sizes of pin adaptors.

These and other objects and advantages of the present invention will appear hereinafter as this disclosure progresses, reference being had to the accompanying drawings, in which:

FIGURE 1 is a sectional view through an assembled piston, pin and rod unit, and showing a tool made in accordance with this invention as used when measuring the proper depth to which the pin must be inserted in the piston, for the purpose of positioning the tool stop preparatory to removing the pins from the pistons;

FIGURE 2 is a view showing only part of the tool housing being used during the pin removal operation;

FIGURE 3 is a cross sectional view of a piston and a rod, which rod is to be connected to the piston, showing the tool in position and holding the piston and rod in aligned relationship, and showing the pin as it is beginning to be inserted in the piston;

Figure 4:
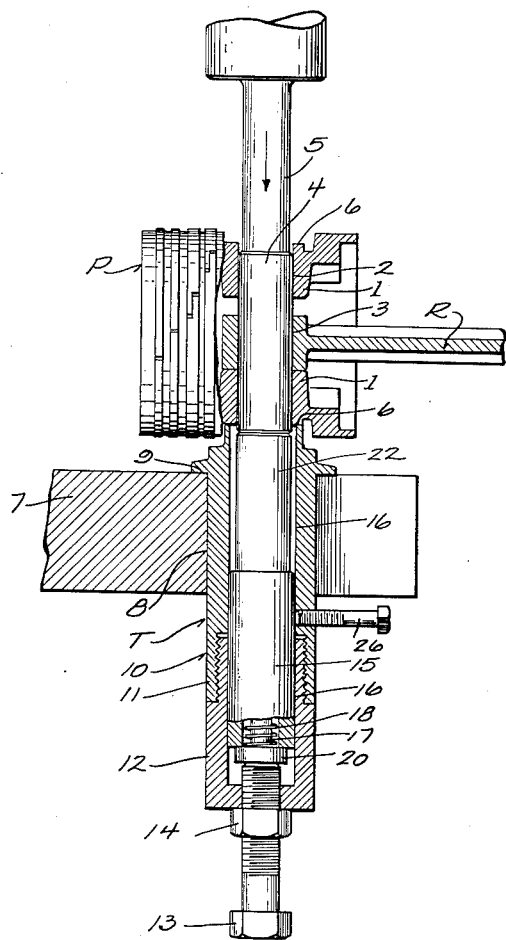
FIGURE 4 is a view similar to FIGURE 2 but showing the pin as being driven into its assembled position and the tool forced from the piston.
Figure 5:
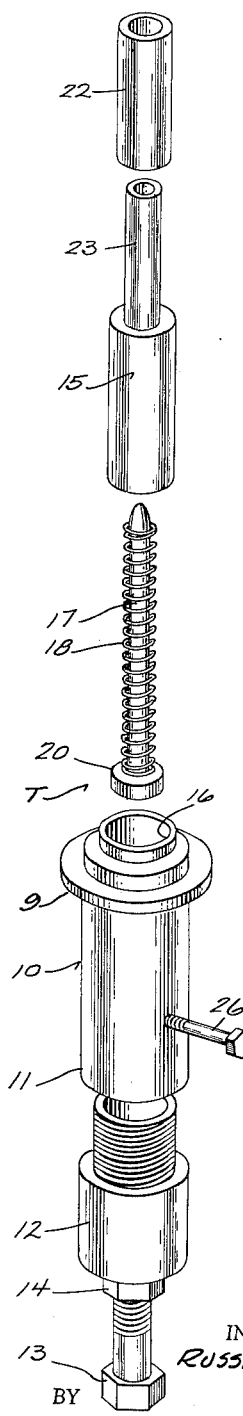
FIGURE 5 is an exploded and perspective view of the tool shown in the other figures.

Referring in greater detail to the drawings, a conventional piston P has a pair of bosses 1 on its internal surface that have aligned apertures 2 extending therethrough. A connecting rod R has an aperture 3 which is alignable with apertures 2 to receive the wrist pin 4. The diameter of the rod aperture 3 is such as to form a press fit with the pin, making it necessary to use considerable force, such as that applied with a hydraulic press indicated at 5, to drive the pin into a fixed position in the rod. The apertures 2 in the piston form only a snug fit with the pin so that the pin and rod are freely oscillatable in the piston.

It will be noted that the length of the pin is such so as not to protrude past the diameter of the piston, and in the example shown the ends of the pin are generally flush with the cut away surface 6 of the piston, when the pin is centered. Furthermore, when the pin is centered in the piston, the rod should be spaced an equal distance from each of the inner surfaces of the bosses 1.

A tool supporting table 7, or other suitable support, has an opening 8 through which a tool T is mounted and held therein by its shoulder 9. Thus the tool is firmly held on a support surface and the piston is placed on the upper end of the tool for receiving the pressure applying means 5 located thereabove.

The tool T comprises a housing 10, which housing includes a sleeve 11 threadably connected with a lower stop portion 12. This stop portion has an adjustable bolt 13 threaded therein and which is locked in any selected position by the stop nut 14. A hollow plunger 15 is reciprocable within the bore 16 of the housing and has a shaft 17 telescopingly mounted therein. A spring 18 surrounds shaft 17 and is located in the hollow plunger where it reacts against the shoulder 19 of the plunger and the cap 20 of the pin. The cap abuts against the stop formed by the adjustable bolt 13 and the spring thus tends to urge the hollow plunger partially out of the housing and to the position shown in FIGURE 3.

The end of the tool which is inserted into the piston and rod is made to accommodate various sizes of piston assemblies by the use of adaptors 22 which slip over the reduced portion 23 of the plunger. Adaptors of various outside diameters can thus be readily slipped on the end of the plunger to fit any particular size hole in the piston and rod.

These adaptors are of a diameter slightly smaller than the pin which they are intended to guide into the assembly. Therefore, the adaptors are readily urged by the spring 18 into the holes in the piston and rod.

*Operation*

In operation, suppose several piston assemblies have been removed from the engine for disassembly. An assembly would be selected which appeared to have the rod centered on its pin. This assembly would then be placed above the tool and the press 5 brought down as shown in FIGURE 1 to a point where the piston lower surface 6 rested firmly on the upper end of the tool housing, the rod rested firmly on the lower boss in the piston and the pin 4 was in firm contact with the plunger through its adaptor 22. This is the "measuring" position as shown in FIGURE 1 in which the position of the plunger relative to the rest of the tool is measured from a properly assembled piston assembly. It will be noticed that the adjustable bolt 13 is not contacted by the plunger cap 20. The next step would therefore be to screw the bolt 13 until it engaged the cap and the nut 14 then tightened to thereby establish a fixed stop for the plunger. Thus a setting is provided in the tool to insure proper reassembly of each of the piston assemblies after they have been disassembled as follows and as shown in FIGURE 2.

As shown in FIGURE 2, the housing portion 12 has been unthreaded which permits the withdrawal of the inner parts of the tool and only the housing sleeve 11 remains in the support. The press 5 then forces the pin from the piston.

To reassemble the piston, rod and pin, the tool would be reassembled, the setting of the stop 13 having remained unchanged in the housing portion 12. As shown in FIGURE 3, the piston and rod would be assembled on the protruding adaptor 22, it being remembered that the adaptor forms only a relatively loose fit with the piston and rod, as compared to the fit of the wrist. The adaptor extends upwardly in the piston only to the height shown, which leaves room for entry of the pin.

The adaptor of the tool thus closely aligns the apertures of the piston with that of the rod and the pin is then inserted readily into the piston by the press. As the pin is pushed downwardly, it forces the plunger 15 and its adaptor 22 into the tool until the plunger bottoms on the cap 20 which in turn bears against the stop 13. At that time the pin is in its proper centered position on the rod. Before the press is lifted, the set screw 26 would be engaged against the plunger to prevent it from leaving the housing. With the plunger thus "cocked" in the housing, the next piston and rod would be placed over the tool and the screw 26 then released to permit the adaptor to enter the piston and rod. Slight movement of the piston and/or rod at this time to secure exact alignment of the holes may be required to facilitate the entry of the adaptor.

A versatile tool has been provided which provides a convenient means for measuring the proper depth to which the pin should be inserted for any given set of piston assemblies. The tool provided by this invention aligns the holes in the piston and in the rod to insure proper entry of the pin without damage.

Various modes of carrying out the invention are contempelated as being within the scope of the following claims particularly pointing out and distinctly claiming the subject matter which is regarded as the invention.

Having thus shown and described the invention, what is desired to be secured by Letters Patent is:

1. A wrist pin inserter tool for aiding in the reassembly of a piston and rod, said tool comprising, a generally hollow housing including a sleeve and a stop portion threadably connected together, an adjustable stop carried by said stop portion for providing a variable depth stop surface within said housing to gauge the position of a given wrist pin which is to be replaced, a plunger reciprocable in said housing and extendable therefrom to an extended position, spring means for urging said plunger to said extended position, said plunger abutting against said stop surface when said plunger is in a fully retracted position within the housing by engagement with a substantially fully inserted wrist pin, and an end portion on said plunger of a diameter slightly less than that of a pin which is to be inserted, said end portion being of such a length so as to extend at least partially through said piston and rod in initial reassembly position.

2. A wrist pin inserter tool for aiding in the reassembly of a piston and rod, said tool comprising, a generally hollow housing said housing including a sleeve and a lower stop portion threadably connected to said sleeve, an adjustable stop in said housing and threadably connected with said stop portion to provide a variable depth stop within said housing to gauge the position of a given wrist pin which is to be replaced, a hollow plunger reciprocable in said housing and having an end portion extendable therefrom to an extended position, an adaptor removably mounted on said end portion and having a diameter less than that of the pin to be inserted, a shaft within said plunger over which the latter telescopes, spring means around said shaft and within said plunger for urging said plunger to said extended position, said shaft abuttable against said stop to define a fully retracted plunger position within said housing by engagement with a substantially fully inserted wrist pin said adaptor being of such a length so as to extend at least partially through said piston and rod in initial reassembly position.

References Cited in the file of this patent

UNITED STATES PATENTS

| | | |
|---|---|---|
| 735,047 | Alsop | Aug. 4, 1903 |
| 2,284,522 | Keen | May 26, 1942 |
| 2,348,265 | Rippingille | May 9, 1944 |
| 2,891,302 | Fuglie | June 23, 1959 |

FOREIGN PATENTS

| | | |
|---|---|---|
| 311,712 | Germany | Apr. 7, 1919 |